June 24, 1941.  C. L. CHERRY  2,246,616
TRUCK FOR FIGHTING FOREST FIRES
Filed July 6, 1939   6 Sheets-Sheet 1

Inventor:
Charles L. Cherry.
by Walter E. Lombard
Atty.

June 24, 1941.     C. L. CHERRY     2,246,616
TRUCK FOR FIGHTING FOREST FIRES
Filed July 6, 1939     6 Sheets-Sheet 6

Inventor:
Charles L. Cherry,
by Walter E. Lombard,
Atty.

Patented June 24, 1941

2,246,616

UNITED STATES PATENT OFFICE 2,246,616

TRUCK FOR FIGHTING FOREST FIRES

Charles L. Cherry, South Carver, Mass.

Application July 6, 1939, Serial No. 283,002

15 Claims. (Cl. 293—55)

This invention relates to apparatus for fighting forest fires and consists of a truck, the chassis of which is provided with two front wheels and eight rear driving wheels, this chassis having mounted thereon a thousand gallon water tank and a rearwardly extending floor on which are mounted high pressure and low pressure pumps driven by an engine at the rear of the tank, said pumps having a plurality of fire hose extending therefrom.

The invention further consists in securing to the front of the chassis a braced metal shield curved downwardly and rearwardly so that the truck may be driven into the forest against the trees and bushes thereof and force them downwardly and sidewise so that the truck may pass over them and between them, along the edges of the fire, permitting the operators to force water under pressure onto the fires while the truck is either moving or at a standstill.

The invention further consists in providing the sides of the truck with outwardly extending curved rub rails which in the forward movement of the truck are adapted to contact with the trees and bushes and force them outwardly from the sides of said truck.

The invention further consists in providing the truck beneath the rub rails with slew skids, the outer curved faces of which are nearer together than the outer curved faces of the rub rails.

The invention further consists in dividing the water tank into a number of compartments, the water from which may be used singly or collectively.

The invention further consists in making the rub rails hollow and adapted to form enclosures for additional sections of hose to be disposed therein.

The invention further consists in providing the water tank with a flat upper wall on which the hosemen may stand and on which the hose to be used may be coiled.

The object of the invention is to produce an apparatus which may be driven directly into the forest regardless of the trees and bushes in advance thereof in order to quickly reach the section of the forest which is aflame.

This and other objects are attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings

Similar characters indicate like parts throughout the several figures of the drawings.

In the drawings, 10 is a chassis preferably of the Ford, Marmon-Herrington type, said chassis being supported in a well known manner on two front wheels 11 and eight rear wheels 12, all of these wheels 11, 12, being actuated by the usual motor at the front end of the truck.

The means for driving the wheels 11, 12, is illustrated only in a general way, as it forms no part of the present invention.

On the forward end of the chassis 10 is mounted a truck body 13 having a cab 14 forming a part thereof.

At the rear of the cab 14, the chassis 10 has mounted thereon a 1000 gallon water tank 15 which is divided into three compartments 16 extending transversely thereof, each compartment 16 having an air vent 17 and an upwardly extending filling pipe 18, the upper end of which is provided with a perforated cap 18x.

Each compartment 16 has a plurality of transverse baffle plates 16x between the lower and upper walls thereof, thus giving great rigidity to the tank 15.

Figure 1:
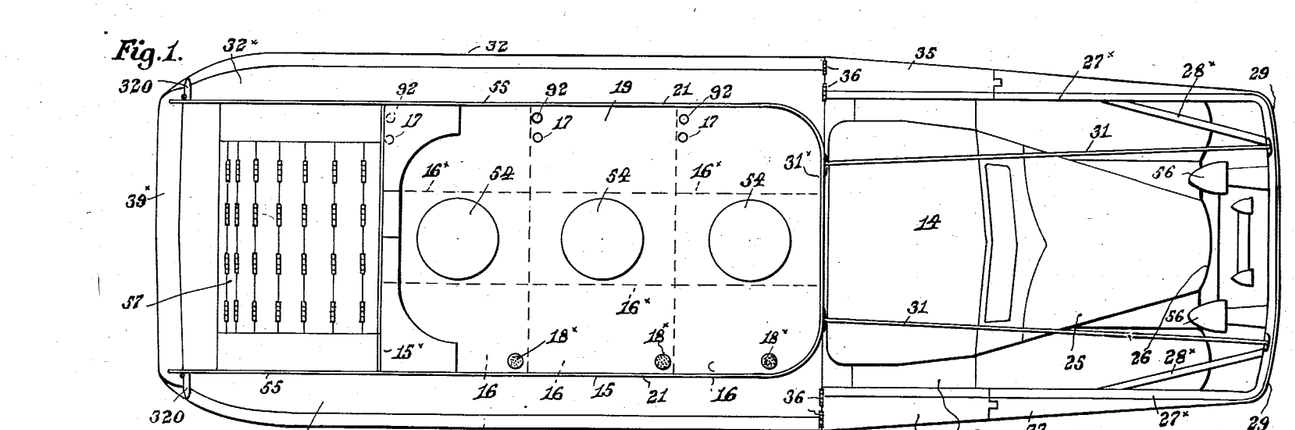
Figure 1 represents a plan of a truck to be used in fighting forest fires.

The tank 15 is provided with a substantially flat upper wall 19 on which the fire hose 20 are adapted to be coiled, as shown in Fig. 1.

The forward part of the upper wall 19 of the tank 15 is left clear of hose and provides standing room for the hosemen while fighting the fire.

The tank 15 has vertical sides 21 extending upwardly above the top wall 19 thereof and a portion of these sides 21 have openings 22 therein through which air may pass.

The body unit 13 is provided with a tool box 23 having a cover 23x hinged at the top by hinges 24.

In front of the hood 25 and radiator 26 is a shield or crowding device 27 of heavy rigid metal suitably secured to the chassis 10 by braces 28.

This shield 27 is curved downwardly and rearwardly with its upper end of greater width than that of the chassis 10 and its lower end disposed between the front wheels 11.

The opposite ends of the front face of the shield 27 are curved rearwardly as at 29, and said shield 27 has parallel extensions 27x extending to the read end of the cab 14 and from these extensions 27x project braces 28x to the rear face of the shield 27, thereby giving great rigidity to said shield.

To the lower end of the opposite sides of the shield 27 are secured angle irons or flanges 30 which during the forward movement of the truck force inwardly any obstructions in the path of wheels 11 so that the truck may pass over such obstructions.

From the top of the shield 27 inclined rods 31 extend over the top of the cab 14 and are secured to the front wall 31x of the tank 15 at the rear of said cab, these rods 31 serving to force tree branches upwardly and over said cab when the truck is moving forward.

From the upper end of the shield 27 and extending rearwardly in a horizontal plane, the truck is provided on opposite sides thereof with rub rails 32 extending the entire length of said truck, which rub rails in the forward movement of the truck contact with trees and bushes at the opposite sides of the truck and force the same outwardly, bending them over so that they will not interfere with the movement of the truck or with the operations of the hosemen on the upper wall 19 of the tank 15.

The forward ends of these rub rails 32 are tapered, as indicated at 33.

Opposite the doors 34 of the cab 14 these rub rails 32 are provided with movable sections 35 hinged at 36 and adapted to be moved upwardly about the pivots of the hinges 36 to permit the opening of the doors 34.

The rub rails 32 are formed of heavy sheet metal and at their outer ends are semicylindrical and in the hollow enclosure formed thereby additional lengths of hose may be disposed to be used when necessity arises for their use.

The rear ends of the rub rails 32 are provided with doors 32® which when opened permit the insertion of sections of hose into the hollow rub rails 32 or the removal of said hose sections when it is necessary to lengthen the hose 20 in order to fight the fire at some distance from the truck.

The upper walls 32x of the rub rails 32 are flat and provide a running board on which men may stand.

Below the rub rails 32 the truck has secured thereto slew skids 37 which extend over the front wheels 11 and are tapered at their forward ends, said skids extending to the shield 27 and to which said skids are secured.

The slew skids 37 extend rearwardly to the wheels 12 and at the rear of these wheels 12 are other slew skids 38 extending to the rear of the truck.

The slew skids 37, 38 at their opposed ends have secured thereto a heavy metal plate 39 extending over the wheels 12.

These slew skids 37, 38 have their outer curved ends nearer together than the outer curved ends of the rub rails 32.

A guard plate 39x is secured to the rear of the truck and extends from side to side thereof.

The floor 40 at the rear of the truck and behind the rear wall 15x of tank 15 is below the upper wall 19 of tank 15 and to this floor is secured a motor 41, the driving shaft 42 of which is adapted to drive a high pressure pump 43 and a low pressure pump 44.

The motor 41 used is preferably a model B Ford motor and the pumps 43, 44 may be operated thereby either singly or together.

The high pressure pump 43 is of the triplex plunger type and capable of discharging 50 gallons of water a minute at 400 pounds pressure and supplies water through pipes to the hose nozzles located at the forward part of the truck in a manner to be hereinafter described.

The pump 43 is only used in pumping water from the tank onto the fire.

The low pressure pump 44 is of rotary type supplying 200 gallons of water per minute at 100 pounds pressure and is used mainly to refill the compartments 16 of tank 15 by pumping from a pond or other water supply and forcing the water into said compartments through pipes leading to openings in the upper wall 19 as will be described hereinafter.

This pump 44 also has a pipe 45 extending therefrom through which water under 150 pounds pressure may be delivered to nozzle 46.

The construction of the motor 41, and pumps 43, 44 form no part of the present invention and therefore need not be illustrated in detail.

The shaft 47 of the motor 41 has secured thereto a gear 48 which meshes with a pinion 49 on the driving shaft 50 of the low pressure pump 44 and said shaft 47 at its outer end is provided with a pinion 51 meshing with a gear 52 on the driving shaft 53 of the high pressure pump 43.

Suitable means may be provided whereby either pump 43, 44 may be driven singly or both pumps driven together.

The upper wall 19 of the tank 15 is provided with a plurality of manhole covers 54, one for each compartment 16.

The upper and rear edges of the sides 21 have secured thereto continuous pipes 55.

At the rear of the shield 27 are the usual head lights 56 which may be raised and lowered in any usual manner.

When the truck is not in use fighting a fire the motor 41 and pumps 43, 44 are all enclosed by the rolling shutters 57 as indicated in Fig. 1.

Secured to the lower end of the rub rails 32 and extending downwardly at an angle are plates 58 which form brush shields to force outwardly any brush with which the truck comes into contact when entering the forest.

The lower ends of these plates 58 are secured to the upper ends of the slew skids 37.

Between the slew skids 37 and the lower ends of the parallel U-shaped members 10 forming the chassis, are iron plates 59 which close the spaces beneath the lower wall of the tank 15.

This iron plate 59 forms a brace for the brush shield 58 and this brush shield is further braced by the member 60 extending from the inner wall of said shield to the upper end of the chassis.

Opposite the rear wheels 12 short inclined plates 58x extend downwardly outside of said wheels.

Figure 5:
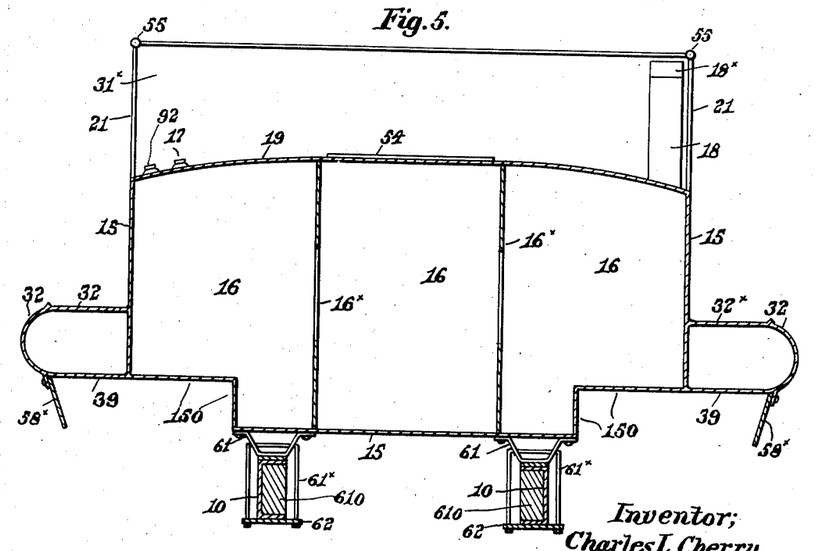
Figure 5 represents a transverse section on line 5, 5 on Fig. 3.
Figure 6:
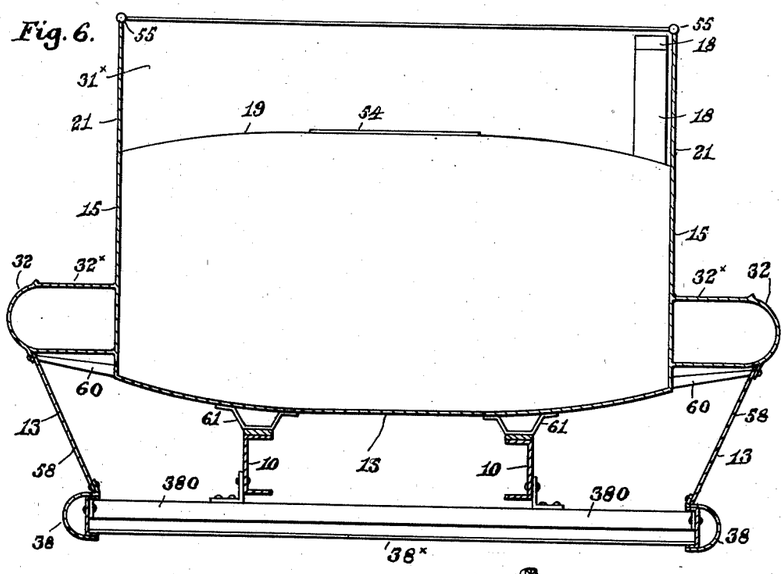
Figure 6 represents a transverse section on line 6, 6 on Fig 3.
Figure 7:
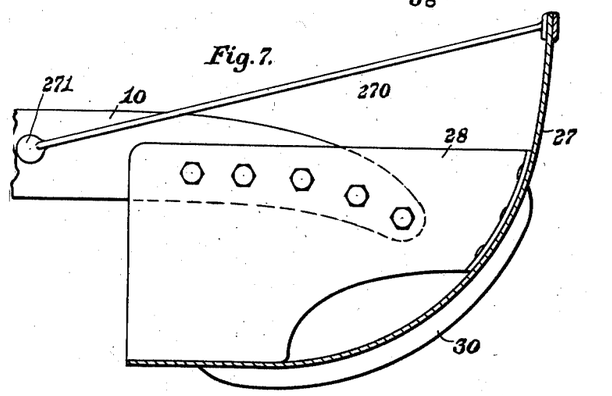
Figure 7 represents a sectional detail of the front shield of the truck showing the means for securing it to the chassis and showing a flange secured to said shield for forcing bushes and shrubbery inwardly out of the path of the front wheels of the truck.
Figure 8:
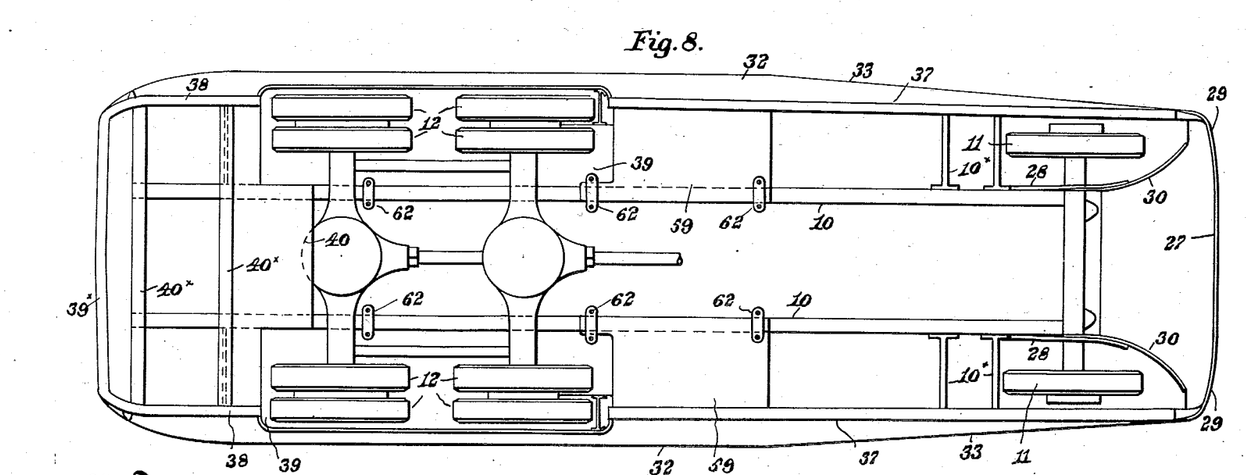
Figure 8 represents an inverted plan of the truck.

At this point the tank 15 is recessed as shown at 150 in Fig. 5 to give sufficient space for the wheels 12.

The lower wall of the tank 15 has secured thereto a plurality of U-shaped strap-supports 61 which rest on the top of the channel irons 10 forming the chassis.

Extending through these supports 61 are U-shaped rods 61x, the vertical portions of which straddle the members 10 and extend through plates 62 beneath the members 10, the projecting ends having nuts thereon whereby the tank may be drawn down into firm contact with the chassis and retained securely in position.

These channel irons 10 are filled with oak blocks 610 to give additional rigidity thereto.

Between the slew skids 38 and secured thereto is a metal plate 38x and above this plate 38x are braces 380 secured to said skids and the chassis 10.

The forward ends of the skids 37 are braced by members 10x extending outwardly from the chassis 10.

Between the skids 38 at the rear of the truck are cross members 40x of channel iron on which the motor 41 and pumps 43, 44 are mounted.

Figure 9:
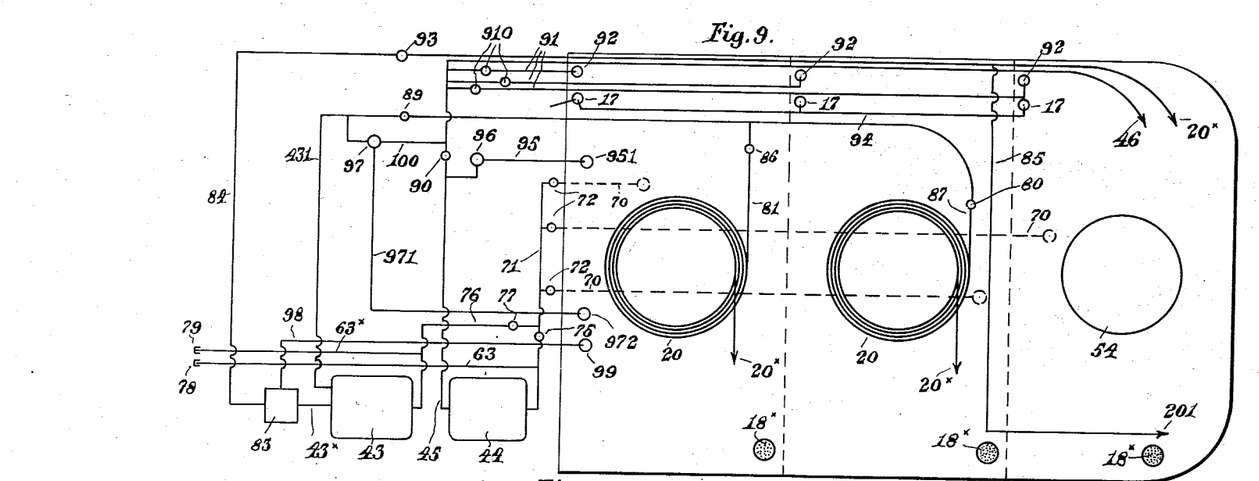
Figure 9 represents a diagram of the piping system connecting the pumps and the tank.
Figure 10:
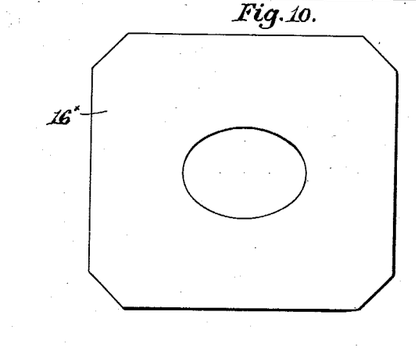
Figure 10 represents an elevation of one of the baffle plates used in each tank compartment.

From the bottom of each compartment 16 of the tank 15 extends a pipe 70 connecting with a transverse pipe 71, each pipe 70 having a valve 72 therein as shown diagrammatically in Fig. 9 of the drawings.

Figure 2:
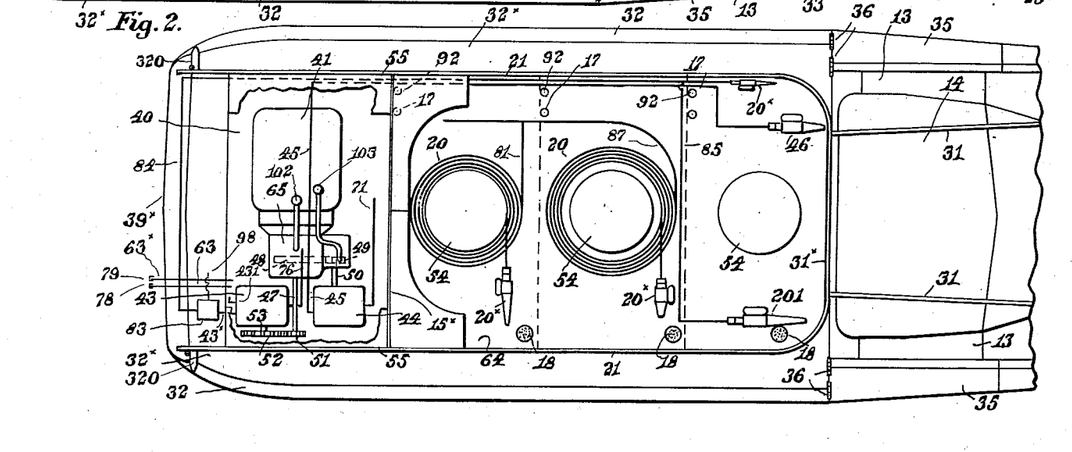
Figure 2 represents a partial plan of the same showing the pumps and the engine for driving the same uncovered, and showing the various hose connections extending from said pumps.
Figure 3:
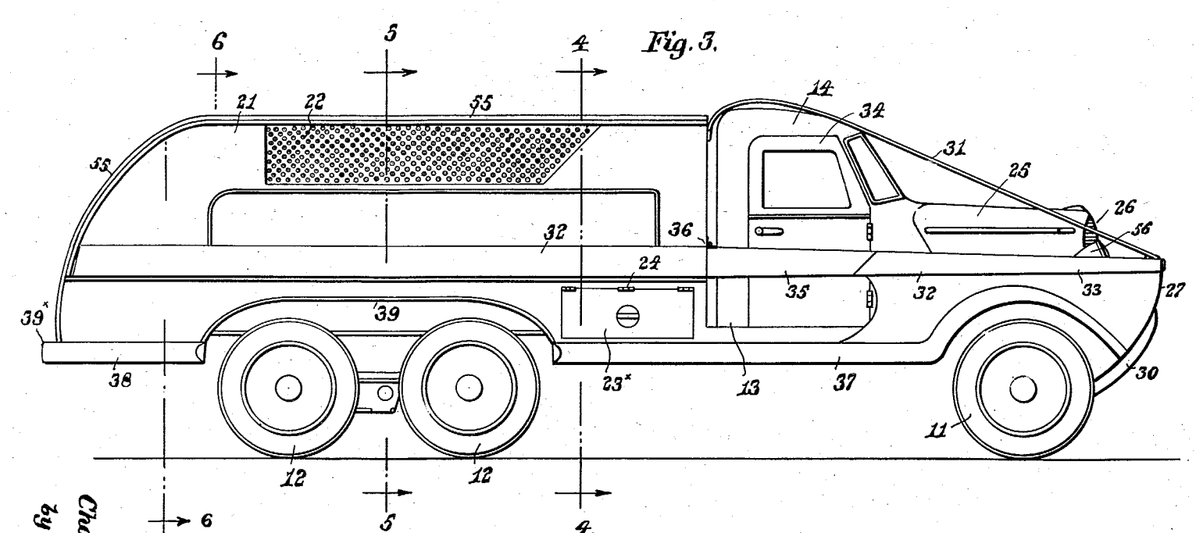
Figure 3 represents a side elevation of the truck.
Figure 4:
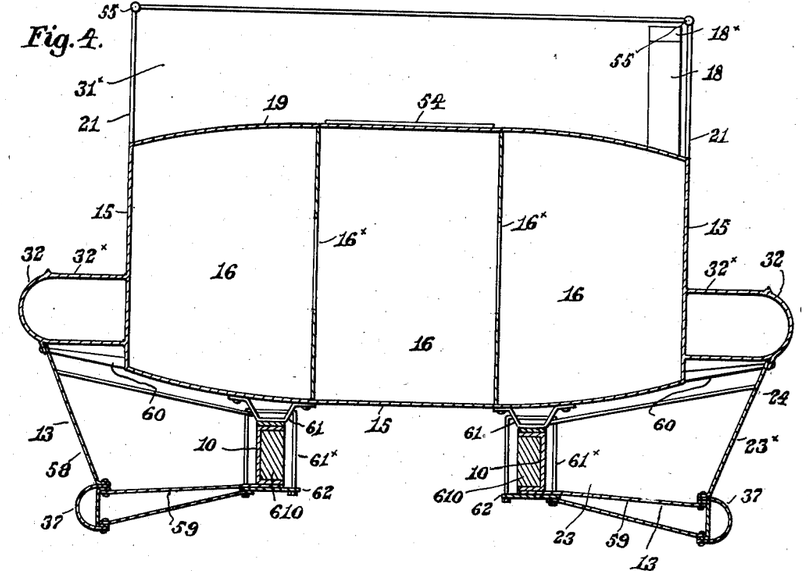
Figure 4 represents a transverse section on line 4, 4 on Fig. 3.

The entire piping system is shown in diagram in Fig. 9, thus avoiding any confusion which would result if an attempt was made to show all the pipes and valves in Fig. 2 of the drawings.

The pipe 71 extends to the low pressure pump 44 and has a valve 75 therein.

From the pipe 71 between the valve 75 and the valves 72 is a pipe 76 which leads to the intake of the high pressure pump 43. This pipe 76 has a valve 77 therein.

From the pipe 71 extends the draft pipe 63, the outer end of which has a closed cap 78 thereon.

From the pipe 76 extends a draft pipe 63x, the outer end of said pipe having a cap 79 thereon.

From the high pressure pump 43 extends a pipe 43x which connects with a high pressure regulator 83 and from this high pressure regulator a pipe 84 extends to the nozzle 20x through which water is adapted to be discharged at 25 gallons a minute and 400 pounds pressure.

From this pipe 84 extends a pipe 85 which leads to a nozzle 201 which is adapted to discharge 18 gallons of water per minute at 400 pounds pressure.

Also extending from the pump 43 is another pipe 431 which supplies water to the hose 20 in the middle compartment, this pipe having a valve 89 therein.

Branching from the pipe 431 is another pipe 81 connecting to the hose 20 in the rear compartment.

The nozzle 20x connected with the hose 20 of the rear compartment 16 is adapted to supply water at 200 pounds pressure at 25 gallons a minute.

The pipe 81 has a valve 86 therein and the pipe 431 has another pipe 87 leading therefrom to the hose 20 in the middle compartment 16, said pipe being adapted to discharge water at 200 pounds pressure at 15 gallons per minute.

The pipe 431 also has a valve 89 therein which when closed cuts off the supply of water to the hose 20.

Leading from the low pressure pump 44 is a pipe 45 which has a valve 90 therein.

From the outer end of the pipe 45 three pipes 91 extend to the filling openings 92 in the upper wall 19 of the tank 15 and each pipe 91 leading to a different compartment 16.

In the pipe 84 is a valve 93 which may be closed to stop the flow of water to the nozzle 46.

Each vent 17 is connected to a pipe 94 which is adapted to permit the escape of air from the top of the compartments and also to permit water to overflow when the compartments 16 become too well filled.

From the pipe 45 extends a pipe 95 having a safety valve 96 therein set at 150 pounds pressure, this pipe 95 communicating with the top of the tank 15 over the rear compartment 16, as indicated at 951.

The pipe 431 also has a safety valve unit 97 set at 200 pounds pressure and, from which extends a pipe 971, the end of which communicates with the top of the rear compartment of the tank 15, as indicated at 972.

From the high pressure regulator 83 extends a pipe 98 which forms a bypass from said high pressure regulator, the forward end of this pipe communicating with the top of the rear compartment of the tank 15, as indicated at 99.

From the pipe 431 is another pipe 100 which connects with the pipe 45.

Each of the pipes 91 has a valve 910 therein and when these valves 910 are open and the valve 90 in the pipe 45 is closed, water may pass from the pipe 431 through the pipe 100 to the filling lines 91, communicating at the opposite ends with the filling openings 92.

When the valves 910 are closed and the valve 90 in the pipe 45 is open, water may pass through the pipe 45, pipe 100, to the pipe 431 and permit the passage of water from the low pressure pump to the hose 20 in the rear and middle compartments 16.

It will be seen, therefore, that water may be discharged from the high pressure pump to the hose 20 or when the pump is out of commission water may be supplied to the hose through the pipe 45 from the low pressure pump or vice versa.

It will be noted that when the truck is moving over a road toward the point where there is a forest fire, the motor 41 and pumps 43, 44, are all enclosed preventing any dirt from entering the compartment in which these devices are installed.

As a consequence, when the truck reaches a point where it is necessary to operate the motor 41 and either or both of the pumps 43 or 44, the roller shutters 57 may be rolled up giving access to said motor and pumps.

At this time, as soon as the motor is operated it is provided with shifting levers 102, 103, whereby either pump 43 or 44 may be driven therefrom.

When the pump 43 is actuated water under pressure of 400 pounds pressure will be forced through the pipes 84 to nozzles 20x to be discharged therefrom onto the fire.

Another pipe 45 leads from the low pressure pump 44 and through this pipe water may be forced under a pressure of 150 pounds to a nozzle 46 to be discharged therefrom upon the fire.

It will be understood that the tank 15 is immovably held in position on the chassis 10 and this tank being made of heavy sheet metal is of such a weight that when the truck is moved it will give considerable momentum to the same when the truck enters the forest and comes into contact with trees therein.

When driven against trees and bushes in the forest the shield 27 will bend over any trees or shrubbery with which it comes in contact and force the same downwardly beneath the truck and between the wheels thereof, thereby permitting the continuous forward movement of the truck.

In practice this truck has broken down trees 6 inches in diameter and passed over the same without difficulty.

As the truck passes between othr trees at the side of the shield 27, the rub rails 32 will contact with these trees and force them outwardly from the sides of the truck.

As these trees are bent over in this manner by the rub rails 32, the slew skids 37 are adapted to come in contact with the lower portions of the trunks of the trees and force them over further.

The brush shields 58, 58x between the rub rails 32 and the slew skids 37, tend to force outwardly any branches which may be on the trees being pushed sidewise and thus prevent any such branches from getting under the wheels or interfering in any manner with the operation of the truck.

The motor for driving the truck is not shown as this is of usual construction and is not a part of the present invention.

The motor or engine 41 is entirely independent of the motor of the truck which drives the wheels 11, 12 in the usual manner.

Owing to the front face of the shield 27 being curved slightly rearwardly at the opposite sides thereof as at 29, brush and other obstructions coming in contact with this portion of the shield are forced outwardly into position for the rub rails 32 to contact therewith.

The making of the forward ends of these rub rails tapered as at 33 assists materially in the operation of forcing outwardly the trees on either side of the truck.

In fighting the fire the hosemen find sufficient standing room on the top 19 of the forward end of the tank 15 and in this position the lines of hose 20 coiled on this top 19 are very accessible.

In some cases, it may be necessary for some of the hosemen to stand on the running board 32x when fighting the fire, and in this case they can easily reach over the side walls 21 of the tank and seize one or more lines of hose with which to discharge water onto the fire.

It is obvious that a truck constructed as herein shown and described, may be used on the right margin of the fire or on the left margin of the fire, as desired.

It is also selfevident that with the truck at a standstill the hose 20 may be lengthened by adding other sections thereto, so that the water from the hose may be discharged onto the fire at points a considerable distance from the truck.

As before stated, the rub rails 32 being made hollow with considerable space therein extending the entire length thereof, the above mentioned additional sections of hose may be carried therein to be used when necessary.

These additional sections of hose may be removed from the compartments within the rub rails 32 by opening the doors 320 at the rear end thereof.

The operation of lifting the sections 35 about their hinges 36 may be performed manually but preferably this work will be done by motor-actuated plungers which may be put in operation by means within the cab 14.

As this particular mechanism forms no part of the present invention it is deemed unnecessary to illustrate and describe the same.

Moreover, provision is made whereby the motor 41 may be placed in operation when desired and other means is provided whereby this motor when in operation may drive either the low pressure pump 44 or the high pressure pump 43.

This mechanism also provides means whereby when necessary both pumps may be actuated at the same time.

For instance, when the water in the tank 15 begins to lower, and it is necessary to continue the fighting of fire, it may be desirable to place the suction hose 63 in a pond or other source of water supply and operate both pumps 43 and 44, the pump 44 in this case drawing water into the pump 44 and forcing it therefrom through the pipe 91 into the filling openings 92, while the pump 43 continues to discharge water to fight the fire.

While in the drawings one means for driving the pump 44 from the motor 41 is shown in dotted lines as a gear 48 and pinion 49, it is quite evident that in lieu of this gear 48 and pinion 49 a regular reduction gearing may be used in the casing 65 of the motor 41.

This fire fighting apparatus has been found to be very effective in use and owing to the abundant supply of water carried in the tank 15 and the use of a motor 41 to operate the high pressure pump 43 so that the water discharged from this pump to the nozzles 20x will be discharged upon the fire at a great pressure, the flames may be more rapidly extinguished than could be accomplished by any other apparatus now in use.

In order to give additional rigidity to the crowding device or shield 27, a rod 270 extends from the rear face thereof beneath each headlight 56 and is secured to the chassis 10 at 271.

Figure 11:
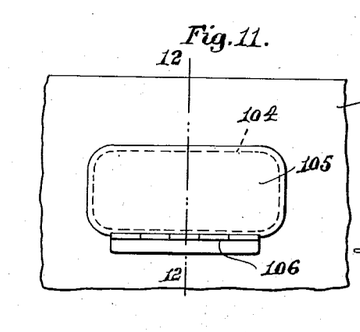
Figure 11 represents a front elevation of a portion of the crowding device or shield.
Figure 12:
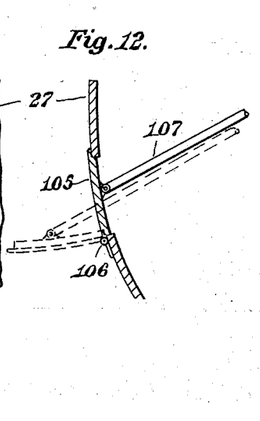
Figure 12 represents a section on line 12, 12 on Fig. 11.

This shield 27 has an opening 104 extending therethrough which is closed by a door 105 hinged at the bottom thereof, as indicated at 106 in Fig. 11 of the drawings.

To the rear face of this door 105 is pivoted a rod 107 which may be operated from the cab 14 to open and close the door as desired.

When fighting a fire this door 105 is closed but when the truck is being driven along the road it is open to give sufficient air to cool the radiator 26.

The advantages of this unit over the conventional type of forest fire apparatus lie in the fact that, first, it carries four to five times the volume of water; second, the special crowding device and guards enable it to leave the road and travel through the woods to and along the line of fire.

Under ordinary conditions, it is not necessary to lay hose, water being applied directly from the forward "deck" of the truck to the fire.

This is accomplished while the unit is in motion, enabling operators to put out the blaze at the rate of from 3 to 4 miles an hour without stopping.

Having thus described my invention, I claim:

1. A motor-driven wheeled vehicle provided with a rigid shield in advance of and secured to the front thereof, said shield being wider than the forward end of the chassis of the vehicle and curved downwardly and rearwardly with its rear and lower end narrower and disposed between the front vehicle wheels.

2. A motor-driven wheeled vehicle as set forth in claim 1, in which said vehicle is provided on opposite sides with outwardly projecting rub rails consisting of rigid metal plates extending the entire length of said vehicle with their outer ends arcuate in cross section.

3. A motor-driven wheeled vehicle as set forth in claim 1, in which each side of said vehicle is provided with two outwardly projecting plates arcuate in cross-section extending lengthwise of the vehicle, the upper plates projecting outwardly further than the lower plates and having flat upper surfaces.

4. A motor-driven wheeled vehicle as set forth in claim 1, in which a cab is provided at the front end of the vehicle and over which inclined rods extend rearwardly from the top of the shield.

5. A motor-driven wheeled vehicle at set forth in claim 1, in which a cab is provided at the front end of the vehicle and over which inclined members extend rearwardly from the top of the shield over the top of the cab, the rear ends of said rods being fixedly secured in position at the rear of said cab.

6. A motor-driven wheeled vehicle as set forth in claim 1, in which the upper curved plates on the sides of the vehicle forming rub rails are hollow forming storage chambers.

7. A motor-driven wheeled vehicle as set forth in claim 1, in which said vehicle is provided on opposite sides with outwardly projecting rub rails extending the entire length of said vehicle, the forward ends of said rails being connected to the opposite edges of said shield and are gradually tapered to said edges.

8. A motor-driven wheeled vehicle as set forth in claim 1, in which said shield is gradually curved downwardly and rearwardly with its lower portion disposed between the front wheels of the vehicle.

9. A motor-driven vehicle provided with a rigid shield in advance thereof secured to the forward end of the chassis by vertical rigid plates, said shield being wider than the chassis of the vehicle and curved downwardly and rearwardly with its lower portion narrower and disposed between the front wheels of the vehicle.

10. A motor-driven vehicle as set forth in claim 9, in which rigid brace rods extend downwardly and rearwardly from the top of said shield with their rear ends fixedly secured to the forward end of said chassis.

11. A motor vehicle as set forth in claim 9, in which said shield is provided with rearward parallel extensions vertically disposed on opposite sides of the motor of said vehicle.

12. A motor vehicle as set forth in claim 9, in which the inner face of said shield in front of the vehicle wheels has secured thereto flanges constructed and arranged to force inwardly beneath the vehicle trees which have been broken down by the shield in the forward movement of said vehicle.

13. A motor vehicle as set forth in claim 9, in which the rear end of the vehicle is provided with a horizontally disposed rigid guard extending rearwardly therefrom and rigidly secured to the chassis thereof.

14. A motor vehicle as set forth in claim 9, in which each side of said vehicle is provided with two outwardly projecting curved plates extending lengthwise of the vehicle, the outer ends of which are arcuate in cross section, the upper plates projecting outwardly further than the lower plates, and inclined flat brush guards interposed between and secured to the upper and lower plates.

15. A motor vehicle as set forth in claim 9, in which the inner face of said shield in front of the forward truck wheels has secured thereto curved flanges extending rearwardly between said wheels.

CHARLES L. CHERRY.